United States Patent Office 3,262,154
Patented July 26, 1966

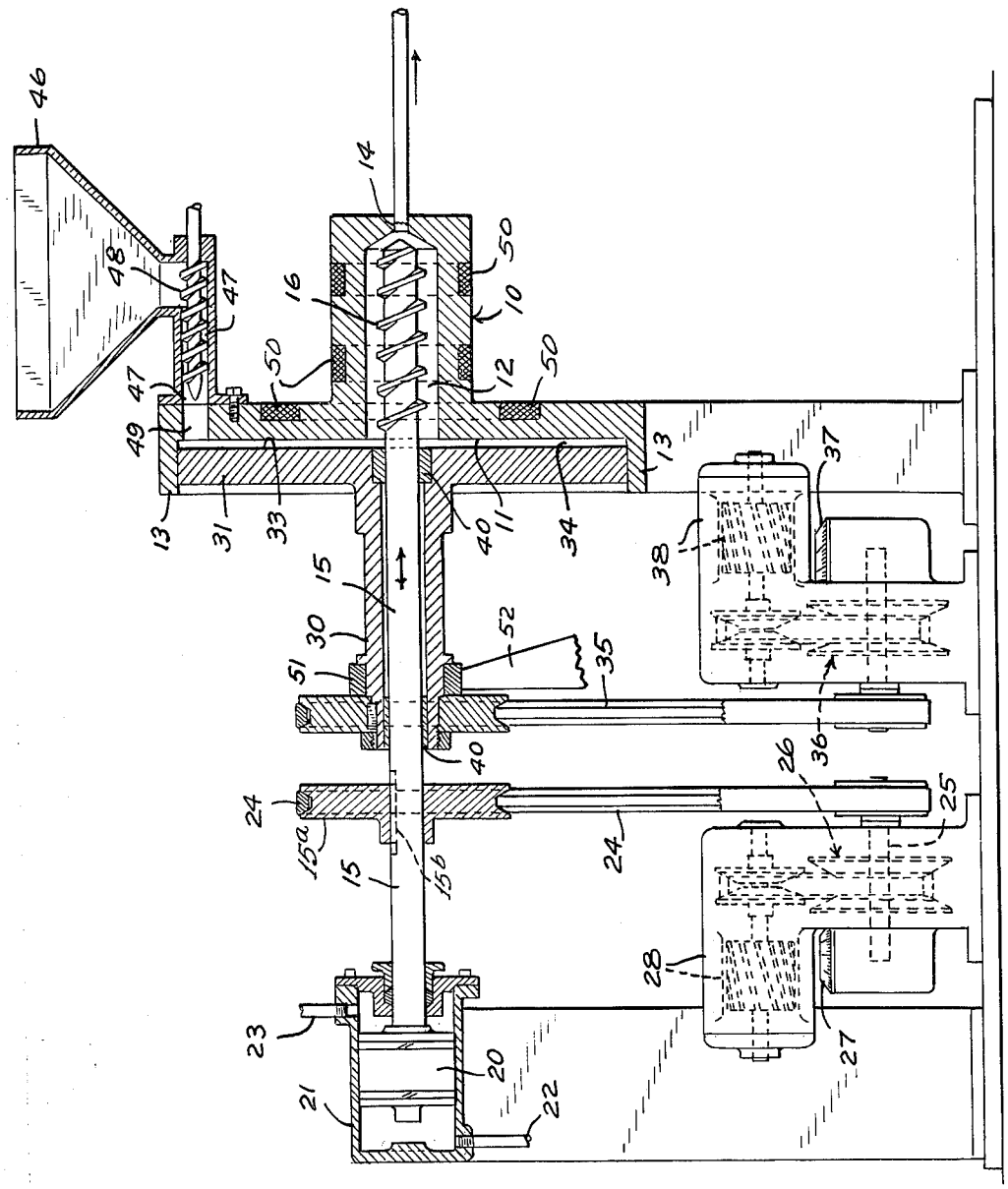

3,262,154
EXTRUDERS FOR PLASTIC MATERIAL
Emery I. Valyi, 5200 Sycamore Ave., Bronx 71, N.Y.
Filed Dec. 6, 1963, Ser. No. 328,666
3 Claims. (Cl. 18—12)

This invention relates to extruders for visco-elastic materials and more particularly to an extruder of the type employing a rotating disc for plasticating the material and feeding it centripetally toward the axis of the disc, and a pressure screw for discharging the plasticated material under relatively high pressure through an extrusion orifice.

An object is to provide an extruder of the above type in which the operation of the rotating disc and that of the pressure screw are independently controllable thereby improving the performance of the device.

Another object is to provide an extruder of the above type which is adapted to extrude the material intermittently in predetermined quantities as required for an intermittent molding operation.

Another object is to provide an extruder of the above type having novel and improved details of construction and features of operation.

Various objects and advantages will be apparent as the nature of the invention is more fully disclosed.

The extruder of the present invention is of the general type shown in U.S. Patent No. 3,032,814 to Miner and in U.S. Patent No. 3,046,603 to Maxwell. This extruder includes a fixed cup and a rotating disc disposed to provide an intervening disc-like space therebetween into which the plastic material is introduced peripherally and from which it is discharged axially through a cylindrical passage terminating in a restricted orifice. A helical screw integral with the disc is disposed in this cylindrical passage and is rotated for increasing the pressure of the plastic material for extrusion through the orifice.

The present invention includes means for driving the rotating disc and the pressure screw independently of each other and at speeds best adapted for the plasticating and the extrusion of a given plastic material, respectively.

The present invention also includes means for reciprocating the pressure screw axially at a rate and by an amount determined by the output requirements. When the shaft is retracted a predetermined quantity of the material is collected in the cylindrical passage and this material is extruded as the pressure screw is advanced. This intermittent feed can be synchronized with the operation of a plastic molding apparatus such as a parison die and blow mold of the type shown in my U.S. Patent No. 3,029,468.

The nature of the invention will be better understood from the following description, taken in connection with the accompanying drawing in which a specific embodiment has been set forth for purposes of illustration.

In the drawing:

The figure is a longitudinal sectional view of an apparatus embodying the invention.

Referring to the drawing more in detail the invention is shown as embodied in an extruder comprising a fixed cup member 10 having a plane transverse surface 11 terminating inwardly in a cylindrical passage 12 and having an annular peripheral lip 13. The cylindrical passage 12 terminates forwardly in an extrusion orifice 14. A shaft 15 extends axially of the cup member 10 into the cylindrical passage 12 and is formed at its forward end with a helical pressure screw 16 which is adapted to cooperate with the passage 12 to feed the plastic material axially through orifice 14.

The shaft 15 is connected to a coaxial piston 20 disposed in a cylinder 21 having fluid supply ducts 22 and 23 at its opposite ends for reciprocating the piston 20 together with the shaft 15 and its pressure screw 16. The shaft 15 is driven through a pulley 15a which may be keyed to the shaft 15 by a key 15b; by a belt 24 from the output shaft 25 of a variable speed drive mechanism 26 having an adjusting means 27 and driven by a motor 28.

A sleeve 30 is disposed on the shaft 15 and carries at its forward end a disc 31 disposed within the confines of the lip 13 and having a plane surface 33 spaced from the cup surface 11 to form a disc-like space 34 therebetween.

The sleeve 30 is driven by a belt 35 from a variable speed mechanism 36 having an adjusting means 37 and driven by a motor 38.

Shaft 15 is journalled for rotation and reciprocation in bearing 40 in sleeve 30. Sleeve 30 is journalled in bearing 51 in a fixed bracket 52 which prevents reciprocation of the sleeve.

Heaters 50 are provided in the cup 10 for heating the plastic material to the desired plasticating temperature.

The plastic material is fed into the space 34 from a hopper 46 terminating in a horizontal passage 47 having therein a feed screw 48 which is driven by suitable means not shown. The passage 47 communicates through an opening 49 in the cup 10 with the space 34 at a point near the periphery of the disc 31.

In the operation of the apparatus the plastic material such as molding powder is introduced into the hopper 46 and advanced by the feed screw 48 into the space 34. The material is plasticated in space 34 under the shearing action of the rotating disc 31 to become visco-elastic at elevated temperature and thereby conditioned to be fed by the action of the rotating disc 31 toward the center thereof and into the axial passage 12 from whence it is fed under pressure by the rotating pressure screw 16 through orifice 14. Rotating disc 31 is driven by variable speed mechanism 35 at that speed which for the given dimensions of gap 33 and for the plastic material to be processed provide the optimum rate of shear and temperature; while pressure screw 16 is driven by variable speed mechanism 26 at that rotational speed which is best suited to produce the pressure desired and which speed is usually different from that of the disc 31.

If the device is used in connection with the apparatus requiring intermittent feeding of plastic, the flow through extrusion orifice 14 has to be interrupted from time to time, to satisfy the requirements of such intermittent feeding. Whenever the flow is thus interrupted, the shaft 15 and pressure screw 16 thereon are retracted under the action of the pressure generated by pressure screw 16 whereby piston 20 moves in a direction away from extrusion orifice 14, displacing oil from cylinder 21 through duct 22, thereby providing space for the plasticated material to accumulate between pressure screw 16 and the extrusion orifice 14. When the shaft 15 and the pressure screw 16 are advanced under the action of pressure fluid admitted through duct 22 acting upon piston 20, the accumulated plasticated material together with the continuously fed plasticated material is extruded from orifice 14. The period of reciprocation of shaft 15 is determined by the requirements of intermittent feed and is controlled by adjusting the fluid supply through the ducts 22 and 23 so as to conform to the desired molding cycle.

What is claimed is:

1. Apparatus for extruding plastic material comprising a cup member having a plane transverse surface terminating axially in a cylindrical passage having an extrusion orifice, a disc having a plane surface coaxial with and spaced from said cup surface to form a disc-like space therebetween, a shaft extending axially through said disc and terminating forwardly in said cylindrical passage, said shaft being rotatable independently of said disc and provided with a helical pressure screw within said passage adapted to advance the plastic material under pressure through said orifice, means introducing the plastic into said space near the periphery of said disc, means rotating said disc for thereby feeding said material centripetally into said cylindrical passage, and means independent of said last means for rotating said shaft.

2. Apparatus for extruding plastic material comprising a cup member having a plane transverse surface terminating axially in a cylindrical passage having an extrusion orifice, a disc having a plane surface coaxial with and spaced from said cup surface to form a disc-like space therebetween, a shaft extending axially through said disc and terminating forwardly in said cylindrical passage, said shaft being rotatable independently of said disc and a helical pressure screw within said passage adapted to advance the plastic material under pressure as the shaft rotates, means introducing the plastic material into said space near the periphery of said disc, means rotating said disc for thereby feeding said material centripetally into said cylindrical passage, means rotating said shaft independently of said disc, and means reciprocating said shaft axially for thereby extruding said material intermittently through said orifice.

3. Apparatus for extruding plastic material as set forth in claim 2, in which said disc is mounted on a sleeve which is journalled on said shaft.

References Cited by the Examiner
UNITED STATES PATENTS

| | | | |
|---|---|---|---|
| 2,629,132 | 2/1953 | Willcox et al. | 18—12 |
| 3,032,814 | 5/1962 | Miner | 18—12 |
| 3,137,034 | 6/1964 | Adams | 18—12 |
| 3,146,287 | 8/1964 | Kleine-Albers | 18—30 |

WILLIAM J. STEPHENSON, *Primary Examiner.*

L. S. SQUIRES, *Assistant Examiner.*